(12) United States Patent
Vajravel et al.

(10) Patent No.: US 12,093,723 B2
(45) Date of Patent: Sep. 17, 2024

(54) DYNAMICALLY ASSIGNING APPLICATIONS TO WORKSPACES BASED ON CONTEXT

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 578 days.

(21) Appl. No.: 17/343,567

(22) Filed: Jun. 9, 2021

(65) Prior Publication Data

US 2022/0398126 A1 Dec. 15, 2022

(51) Int. Cl.
  *G06F 9/48* (2006.01)
  *G06F 9/54* (2006.01)
(52) U.S. Cl.
  CPC ............ *G06F 9/4856* (2013.01); *G06F 9/542* (2013.01)

(58) Field of Classification Search
  None
  See application file for complete search history.

(56) References Cited

U.S. PATENT DOCUMENTS

2017/0277525 A1* 9/2017 Czarnecki ........... H04L 41/0853
2018/0293118 A1* 10/2018 Gamage ................ G06F 9/546
2021/0160283 A1* 5/2021 St. Pierre ............ H04L 63/1491

* cited by examiner

*Primary Examiner* — Craig C Dorais
(74) *Attorney, Agent, or Firm* — Kirton McConkie; Brian Tucker

(57) ABSTRACT

Applications can be dynamically assigned to workspaces based on context. As a user uses applications on a computing device, the context of the computing device can be monitored. When the context changes, it can be determined, for each application, which workspace is relevant to the application based on the changed context. If the relevant workspace is different from a current workspace, the application can be dynamically reassigned to the relevant workspace. As part of reassigning an application to a workspace, the application's dependencies may be updated and the application's context may be preserved.

20 Claims, 13 Drawing Sheets

Workspace Relevance Calculation Component 401

Application A

| Type of Computing Device | Network | OS Updated? | AV Updated? | GPU Available? | Relevant Workspace |
|---|---|---|---|---|---|
| Corporate | Corporate | Y | Y | Y | Performance |
| Non-Corporate | VPN | Y | Y | Y | Performance |
| Non-Corporate | Non-Corporate | N | Y | N/A | Security |

Application B
...

Application Type and Dependency Determination Component 402

Application A

| Type of Container Change | Application Type | New Dependencies |
|---|---|---|
| None | No Change | No Change |
| SW to HW | Native Preferred | Bundle and deploy vGPU driver |
| HW to SW | Native Preferred | Remove vGPU driver from catalog |
| Any to SW browser | PWA | Remove dependencies from catalog/bundle |
| SW browser to SW | Native Preferred | None |
| SW browser to HW | Native Preferred | Bundle and deploy vGPU driver |

Application B
...

*FIG. 4*

DYNAMICALLY ASSIGNING APPLICATIONS TO WORKSPACES BASED ON CONTEXT

CROSS-REFERENCE TO RELATED APPLICATIONS

N/A

BACKGROUND

Containerization in the software context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 110. Application 121 is an example of an application that is not containerized in that it relies on binaries/libraries 120 to interface directly with host operating system 110 (i.e., application 121 is a native application). In contrast, applications 122-125 are examples of containerized applications.

Applications 122 and 123 represent examples in which containerization is implemented using software virtualization. Examples of solutions that implement containerization through software virtualization include Docker and FreeBSD Jails. As represented in FIG. 1, each application 122 and 123 and its binaries/libraries 131a and 131b may be isolated within its own container 132 that is executed via a docker engine 130 that runs on host operating system 110.

Applications 124 and 125 represent examples in which containerization is implemented using hardware virtualization. Examples of solutions that implement containerization through hardware virtualization include Intel Clear Containers, Hyper-V Docker and Qubes OS. As represented in FIG. 1, with hardware-based containers, a uni/mini kernel 140 is executed on hypervisor 102. A docker engine 141 can then be run on uni/mini kernel 140 to containerize applications 124 and 125 and their respective binaries/libraries 142a and 142b. Hardware-based containers are oftentimes used to host untrusted applications (because they provide hardware isolation) or applications requiring a different operating system than host operating system 110.

These containerization techniques could also be used in a cloud context. For example, computing device 100 could represent a server that allows user computing devices to access applications 121-125 via virtual desktop infrastructure techniques.

It is becoming more common for an enterprise to use containerization solutions to run applications on computing devices that its employees may use. A primary benefit of employing containerization solutions is that it enables the applications to be deployed and launched from a cloud-based management server or other centralized repository as opposed to being installed on the computing devices as native applications. As a result, the employees can launch the applications on a variety of computing devices such as a work computer, a home computer, a smart phone, etc.

BRIEF SUMMARY

The present invention extends to systems, methods and computer program products for dynamically assigning applications to workspaces based on context. As a user uses applications on a computing device, the context of the computing device can be monitored. When the context changes, it can be determined, for each application, which workspace is relevant to the application based on the changed context. If the relevant workspace is different from a current workspace, the application can be dynamically reassigned to the relevant workspace. As part of reassigning an application to a workspace, the application's dependencies may be updated and the application's context may be preserved.

In some embodiments, the present invention may be implemented as a method for dynamically assigning an application to a workspace based on context. It can be detected that a context of a computing device has changed while a first application is running on the computing device in a first workspace. Based on the changed context, it can be determined that a second workspace is relevant to the first application. The first application can be stopped in the first workspace and run in the second workspace.

In some embodiments, the present invention may be implemented as computer storage media storing computer executable instructions which when executed by one or more processors implement a method for dynamically assigning an application to a workspace based on context. An agent executing on a computing device can register to be notified of events that occur on the computing device. In response to being notified of an event, the agent can send a representation of the event to an orchestrator. In response to sending the representation of the event to the orchestrator, the agent can receive, from the orchestrator, a bundle for a first application that was running in a first workspace when the event occurred. The bundle can then be deployed to a second workspace on the computing device to thereby cause the first application to be run in the second workspace.

In some embodiments, the present invention may be implemented as a method for dynamically assigning an application to a workspace based on context. It can be detected that a context of a computing device has changed while a first application is running on the computing device in a first workspace. Based on the changed context, it can be determined that a second workspace is relevant to the first application. The first application can then be reassigned to the second workspace.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 4 provides examples of components that may be used in determining whether and how an application may be dynamically reassigned to a workspace.

DETAILED DESCRIPTION

In this specification and the claims, the term "workspace" will be used to reference a theme by which containerized applications are grouped. A workspace may oftentimes include a single container within which all applications in the group are containerized and to which the theme is applied. However, a workspace could also include multiple containers in which the applications in the group are containerized if the same theme is applied to each of the multiple containers. Examples of workspaces (or themes) include a performance workspace (e.g., a container that is configured to optimize the performance of the applications running in the container), a security workspace (e.g., a container that is configured to optimize the security of the applications running in the container), a hardware-enabled workspace (e.g., a container that is configured to enable the applications running in the container to access peripherals or other hardware), a corporate workspace (e.g., a container customized for a workplace environment), a home workspace (e.g., a container customized for a home environment), a public workspace (e.g., a container customized for a public environment), etc. However, embodiments of the present invention should not be limited to any particular type of workspace (or theme).

Figure 2:
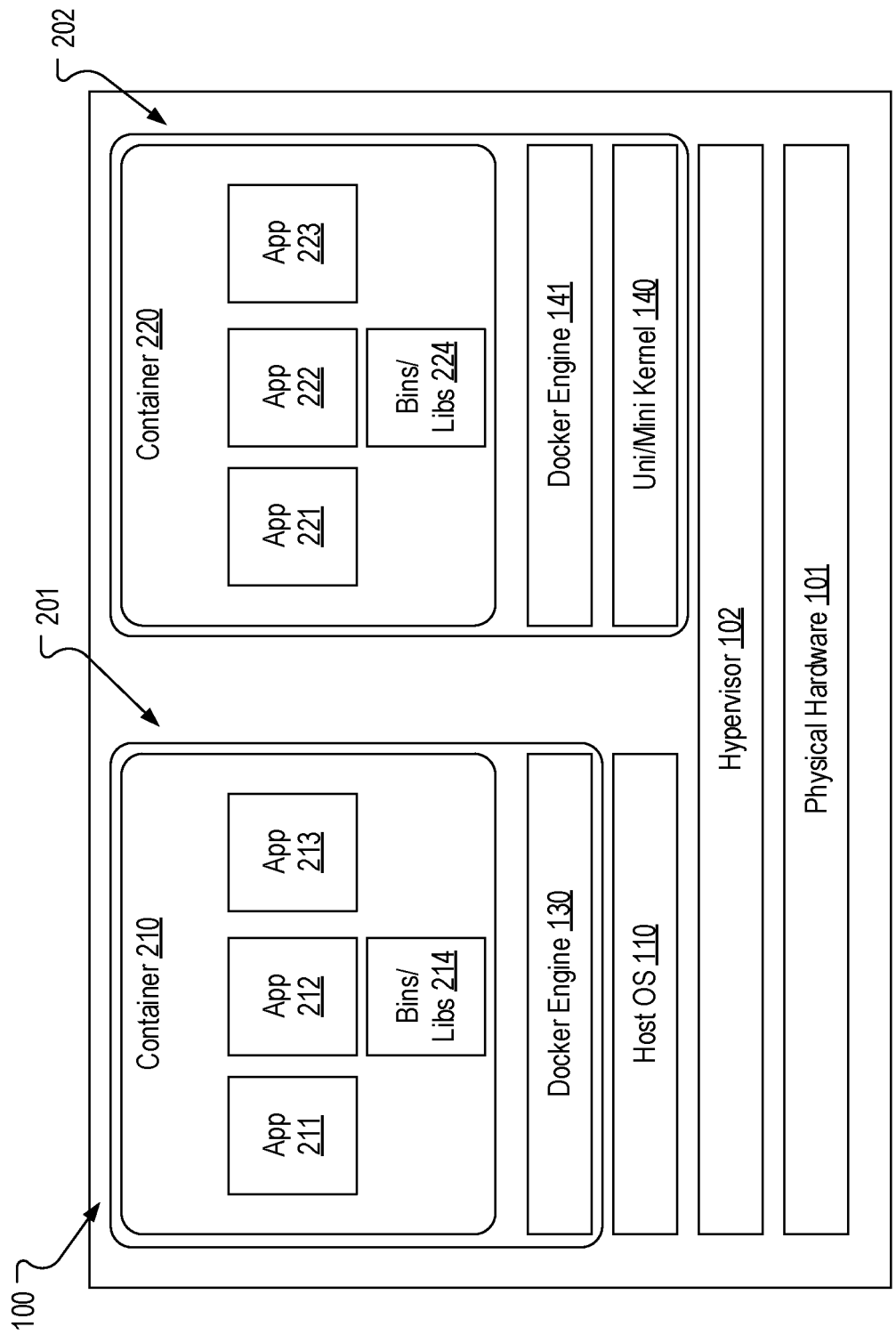
FIG. 2 provides an example of how containers may be used to implemented workspaces.

FIG. 2 provides an example of how workspaces may be implemented on computing device 100. In this example, there is a software-based container 210 in which applications 211-213 are containerized along with their respective binaries and libraries 214. A particular theme could be applied to container 210 such that container 210 may constitute a workplace 201. In other words, each of applications 211-213 may be assigned to workspace 201 by virtue of their being containerized in container 210. Similarly, in this example, there is a hardware-based container 220 in which applications 221-223 are containerized along with their respective binaries and libraries 224. A particular theme could be applied to container 220 such that container 220 may constitute a workplace 202. In other words, each of applications 221-223 may be assigned to workspace 202 by virtue of their being containerized in container 220. Although not shown, a container could be deployed on a server to run one or more applications that are made accessible to computing device 100 (e.g., via VDI techniques) and a particular theme could be applied to the server-deployed container such that the server-deployed container may constitute a particular workspace.

At any given time, one or more workspaces may be implemented on a computing device, including scenarios where the workspace is implemented by deploying a container on the computing device and scenarios where the workspace is implemented by deploying a container on a server and making applications running in the container accessible to the computing device. For example, in some cases, all applications deployed on a computing device may be assigned to the same workspace at a particular time. In other cases, a first set of one or more applications deployed on a computing device may be assigned to a first workspace and a second set of one or more applications deployed on the computing device may be assigned to a second workspace at a particular time. Accordingly, a wide variety of workspace configurations and scenarios may be encompassed by embodiments of the present invention. As described below, in accordance with embodiments of the present invention, an application can be assigned to a workspace dynamically based on context.

Figure 1:
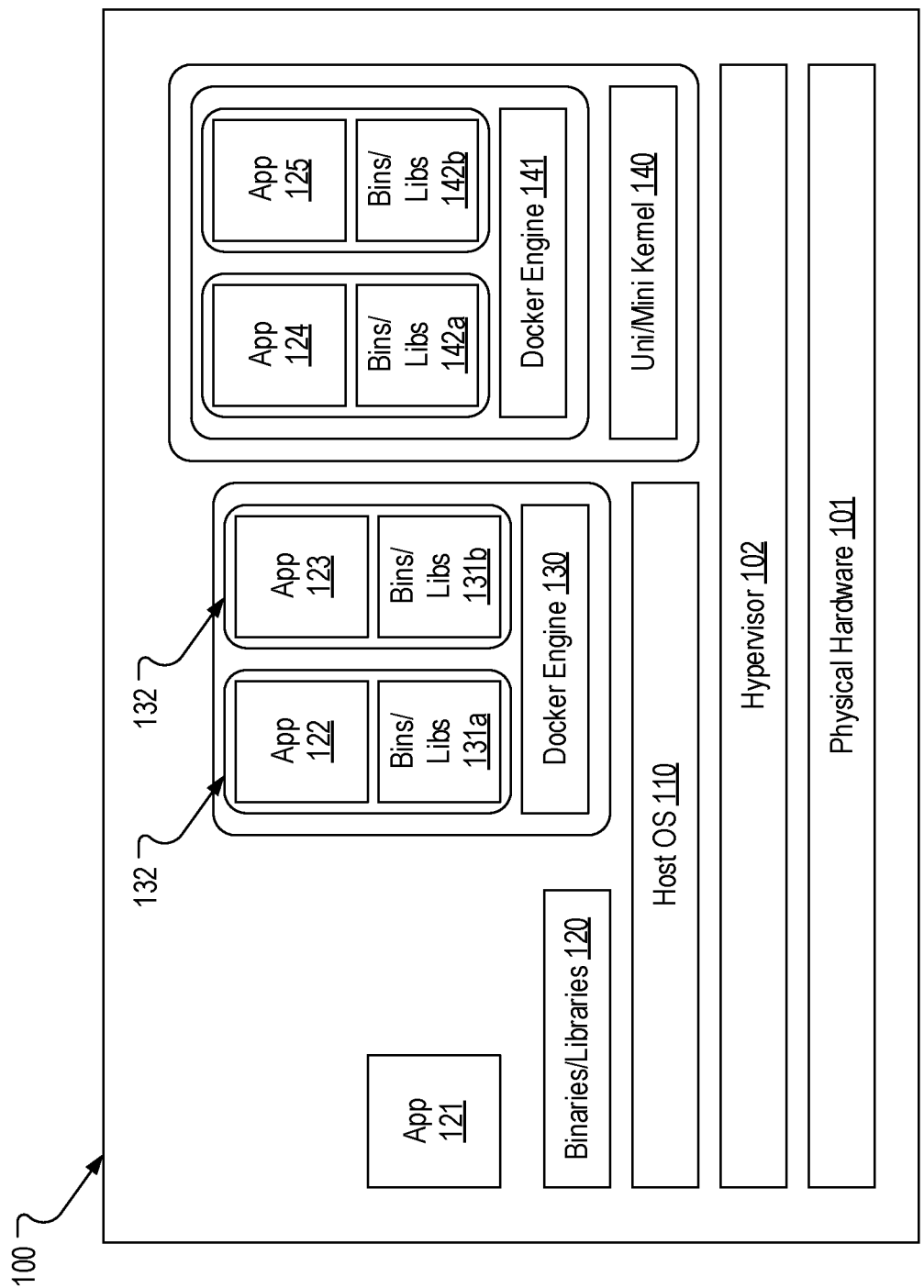
FIG. 1 provides examples of various types of containers that can be used to execute an application on a computing device.
Figure 3:
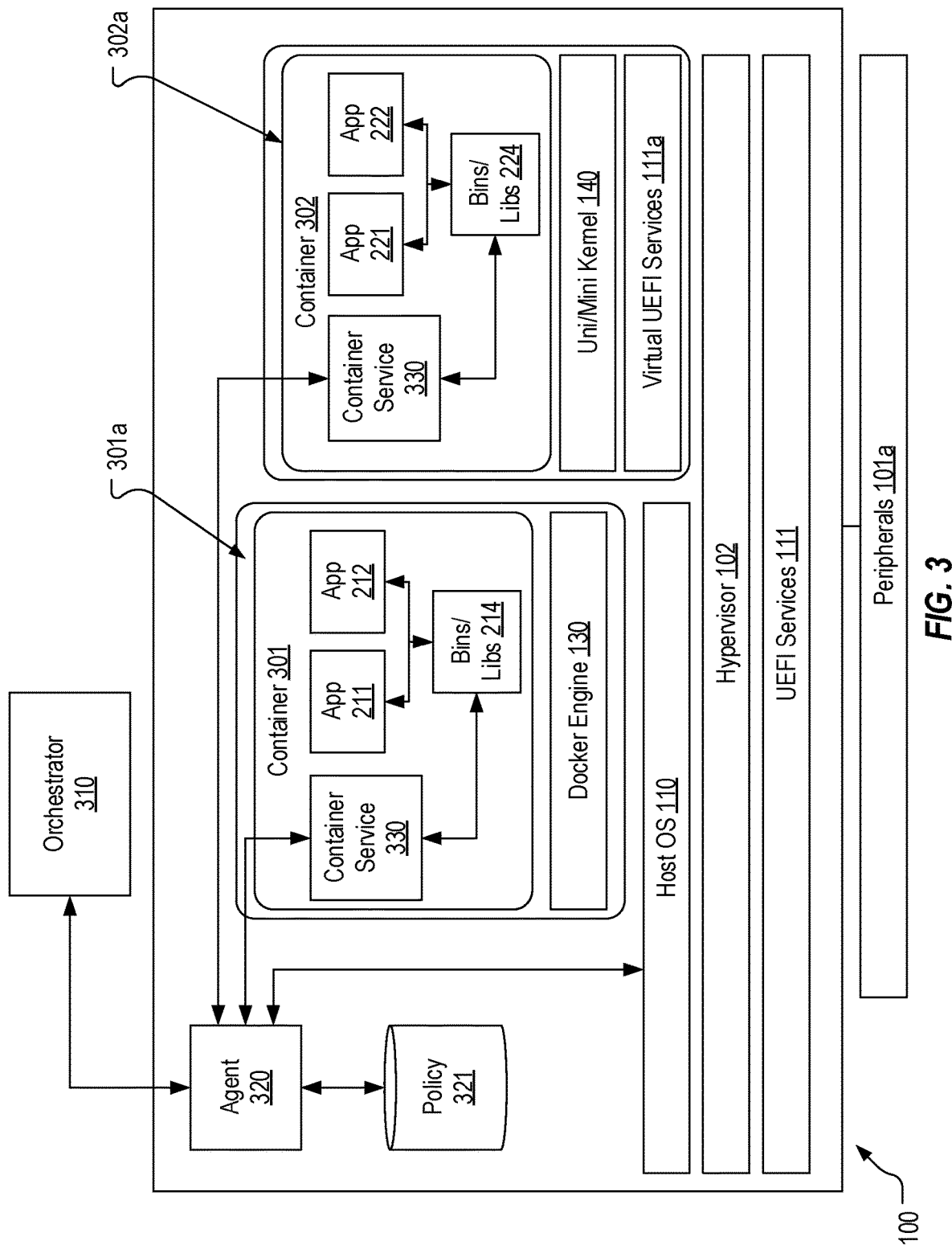
FIG. 3 provides an example of various components that may be used to implement embodiments of the present invention.

FIG. 3, which is based on FIGS. 1 and 2, provides an example of a computing architecture that can be employed in one or more embodiments of the present invention to enable applications to be dynamically assigned to a workspace based on context. In this example, it is assumed that computing device 100 includes hypervisor 102, host operating system 110, one or more peripherals 101a (e.g., a USB drive, a webcam, a fingerprint scanner, a smartcard reader, etc.) and UEFI services 111 (or any other BIOS or firmware). It is also assumed that computing device 100 is configured to deploy hardware and software containers. For example, computing device 100 is shown as having a container 301 in which applications 211 and 212 and their libraries and binaries 214 are running and as having a container 302 in which applications 221 and 222 and their libraries and binaries 224 are running. Container 301 is assumed to be a software container that is deployed by docker engine 130, while container 302 is assumed to be a hardware container that is run on uni/mini kernel 140. Due to the isolation that container 302 provides, virtual UEFI services 111a are provisioned inside container 302.

To enable applications to be dynamically assigned to a workspace based on context, a container service 330 can be deployed in any container that is used to implement a workspace on computing device 100 (e.g., in containers 301 and 302). Container service 330 may interface with the containerized applications' binaries and libraries or otherwise interface with the containerized applications as described below.

An agent 320 can be run on computing device 100 outside the containers that are used to implement workspaces (e.g., as a native application or service). Agent 320 can be configured to communicate with each instance of container service 330. Agent 320 may also interface with one or more components of host operating system 110 such as, for example, an ACPI/UEFI interface moderator. Agent 320 may use policy 321, which can represent any data structure (s) stored on computing device 100 or accessible to agent 320, to perform the functionality described herein.

In some embodiments, an orchestrator 310 may be run outside of computing device 100, such as on a management server, and may interface with agent 320. For example, orchestrator 310 could interface with an instance of agent 320 running on many computing devices 100 such as all of a company's managed computing devices. In some embodiments, however, orchestrator 310, or at least the functionality it performs, could be local to computing device 100.

FIG. 4 provides an example of components that can be used to dynamically assign applications to workspaces based on context in accordance with one or more embodiments of the present invention. Workspace relevance calculation component 401 can represent one or more data structures, logic, artificial intelligence or any other mechanism that orchestrator 310 may use to identify which workspace of a plurality of available workspaces is the most relevant for a particular application given a current context of a computing device. For example, for application A, workspace relevance calculation component 401 identifies five "context factors" which may define the context of a computing device and associates a relevant workspace with different combinations of the five context factors. These five example context factors include the type of the computing device (e.g., whether it is a corporate computing device, a non-corporate (e.g., personal) computing device, etc.), the type of network connection the computing device is using (e.g., a direct connection to the corporate network, a VPN connection to the corporate network, a connection via a non-corporate (e.g., home) network, etc.), whether the computing device's operating system is updated, whether the computing device's antivirus software is updated and whether the computing device has a GPU. Workspace relevance calculation component 401 could include/employ a wide variety and number of context factors for determining context, and therefore the corporate-based example in FIG. 4 should not be considered limiting. Furthermore, the same context factors that are used to determine relevant workspaces for one application need not be the same as the context factors that are used to determine the relevant workspaces for another application.

As described in greater detail below, orchestrator 310 can determine the context factors for a computing device at a particular time and use them to determine, via workspace relevance calculation component 401, the relevant workspace for each application based on the context defined by some combination of context factors. For example, if orchestrator 310 determines that a particular computing device is a corporate computing device that is connected to the corporate network and has an updated operating system, updated antivirus software and a GPU available, orchestrator 310 could use workspace relevance calculation component 401 to determine that the performance workspace is the workspace that is relevant to application A based on the current context of the particular computing device. On the other hand, if orchestrator 310 determines that a particular computing device is not a corporate computing device, is not connected to the corporate network, does not have an updated operating system and has updated antivirus software and a GPU, orchestrator 310 could use workspace relevance calculation component 401 to determine that the security workspace is the workspace that is relevant to application A based on the current context of the particular computing device.

In some embodiments, workspace relevance calculation component 401 could be manually defined (e.g., by an administrator based on the administrator's preferences and experience). In other embodiments, workspace relevance calculation component 401 could employ machine learning or other artificial intelligence techniques to learn and refine which contexts should be considered and which workspaces are relevant to the contexts.

Notably, the relevant workspaces that are identified in/by workspace relevance calculation component 401 can be those that are available on the computing device for which the calculation is being made. In other words, the relevant workspaces can be those in which the respective application can be deployed.

FIG. 4 also includes an application type and dependency determination component 402. Application type and dependency determination component 402 can represent one or more data structures, logic, artificial intelligence or any other mechanism that orchestrator 310 may use to identify the type of the application that should be used and any adjustments in its dependencies that should be made when the application is assigned to a different workspace. As described in detail below, when orchestrator 310 determines that an application should be assigned to a different workspace based on a change in context, orchestrator 310 can use application type and dependency determination component 402 to determine, based on any change in the container that the assignment to the different workspace may entail, whether a different type of the application should be deployed and/or whether any adjustments in the application's dependencies should be made.

In the example in FIG. 4, application type and dependency determination component 402 indicates that, when application A is moved from a software container to a hardware container, a native version of application A should be deployed in the hardware container and a vGPU driver should also be bundled (e.g., included in the binaries and libraries) and deployed in the hardware container. Application type and dependency determination component 402 also indicates that, when application A is moved from any type of container to a software browser container, a progressive web app (PWA) version of application A should be deployed and any dependencies should be removed from the catalog/bundle.

Figure 5A:
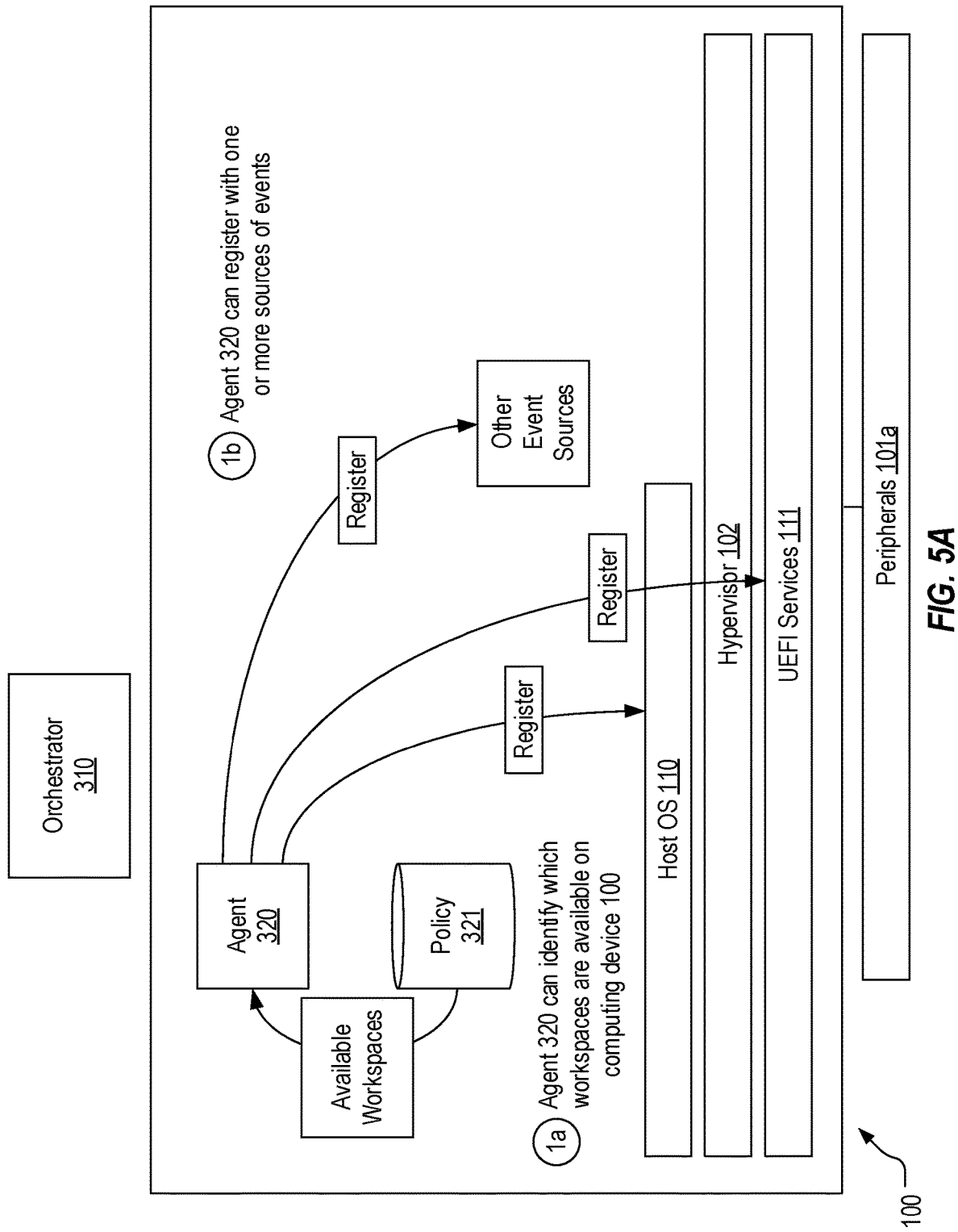
FIGS. 5A-5I provide an example of how applications can be dynamically reassigned to workspaces in accordance with one or more embodiments of the present invention.

FIGS. 5A-5I provide an example, in the context of FIG. 3, of how applications can be dynamically assigned to workspaces based on context in accordance with one or more embodiments of the present invention. Turning to FIG. 5A, it is assumed that agent 320 is being loaded on computing device 100. As part of initialization, in step 1a, agent 320 can identify which workspaces are available on computing device 100. For example, agent 320 could access policy 321 to obtain a list of workspaces that are available for implementation on computing device 100.

Also as part of initialization, in step 1b, agent 320 can register with one or more sources of events to be notified when certain events occur. For example, agent 320 could register with hardware event sources (e.g., to be notified when the battery level drops below a threshold) and/or with software event sources (e.g., to be notified of calendar events or network changes). Agent 320 may register for any type of event whose occurrence might suggest that the context of computing device 100 may have changed.

Figure 5B:
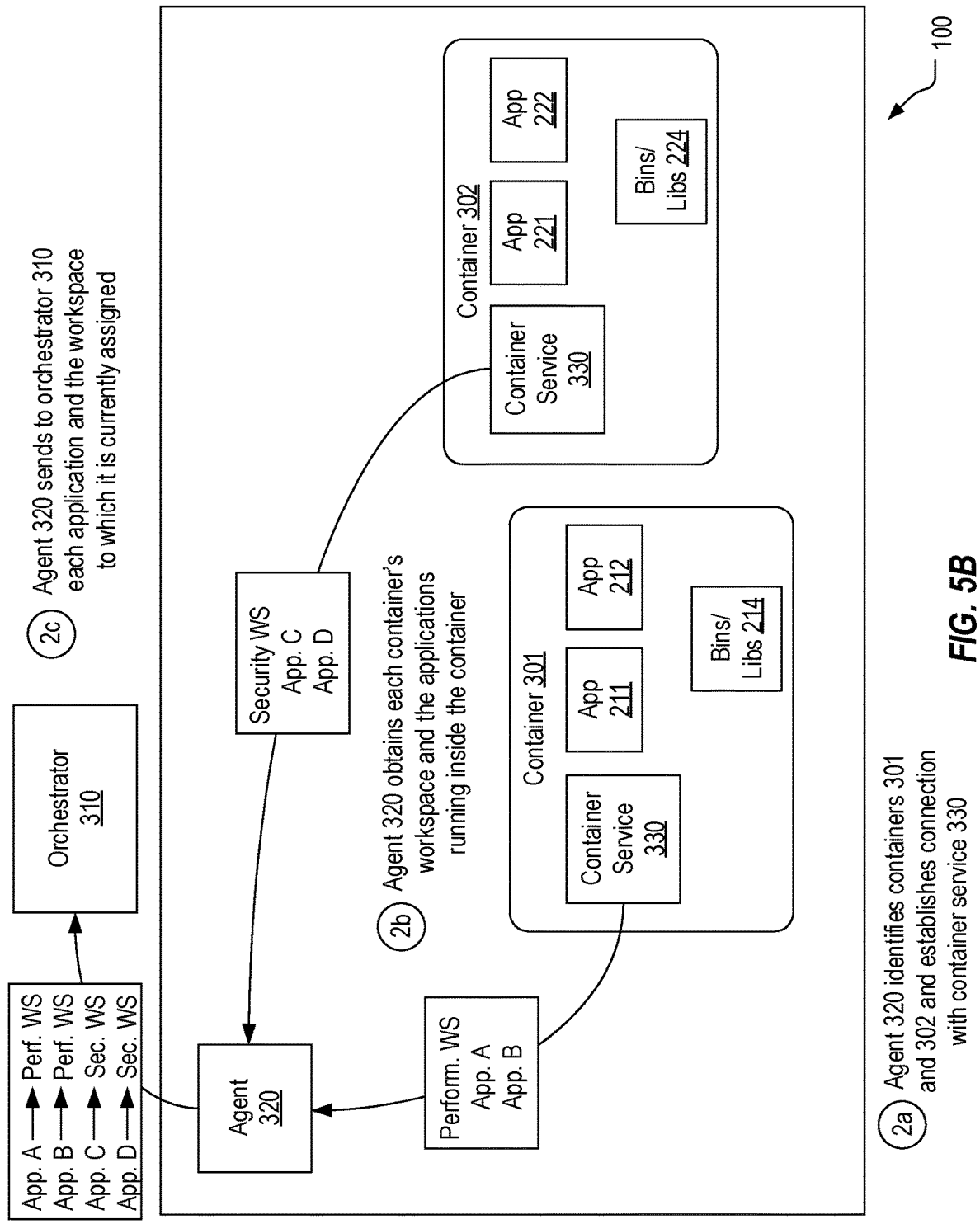

Turning to FIG. 5B, in step 2a, agent 320 can identify containers 301 and 302 (or any other container that may be deployed) and can establish a connection with container service 330. For example, agent 320 could interface with docker engine 130 to determine that container 301 has been deployed and to obtain information necessary to establish a connection with the instance of container service 330 running therein (e.g., an IP address of container 301).

In step 2b, agent 320 can communicate with container service 330 to determine which workspace each of containers 301 and 302 implements and to determine which applications are running in each of containers 301 and 302. In this example, it will be assumed that container 301 is implementing the performance workspace and container 302 is implementing the security workspace. In step 2c, agent 320 can send to orchestrator 310 an identification of each application running on computing device 100 and the workspace to which the application is currently assigned. In some embodiments, agent 320 may perform steps 2b and 2c periodically to thereby keep orchestrator 310 informed of which applications are running in which workspaces.

Figure 5C:
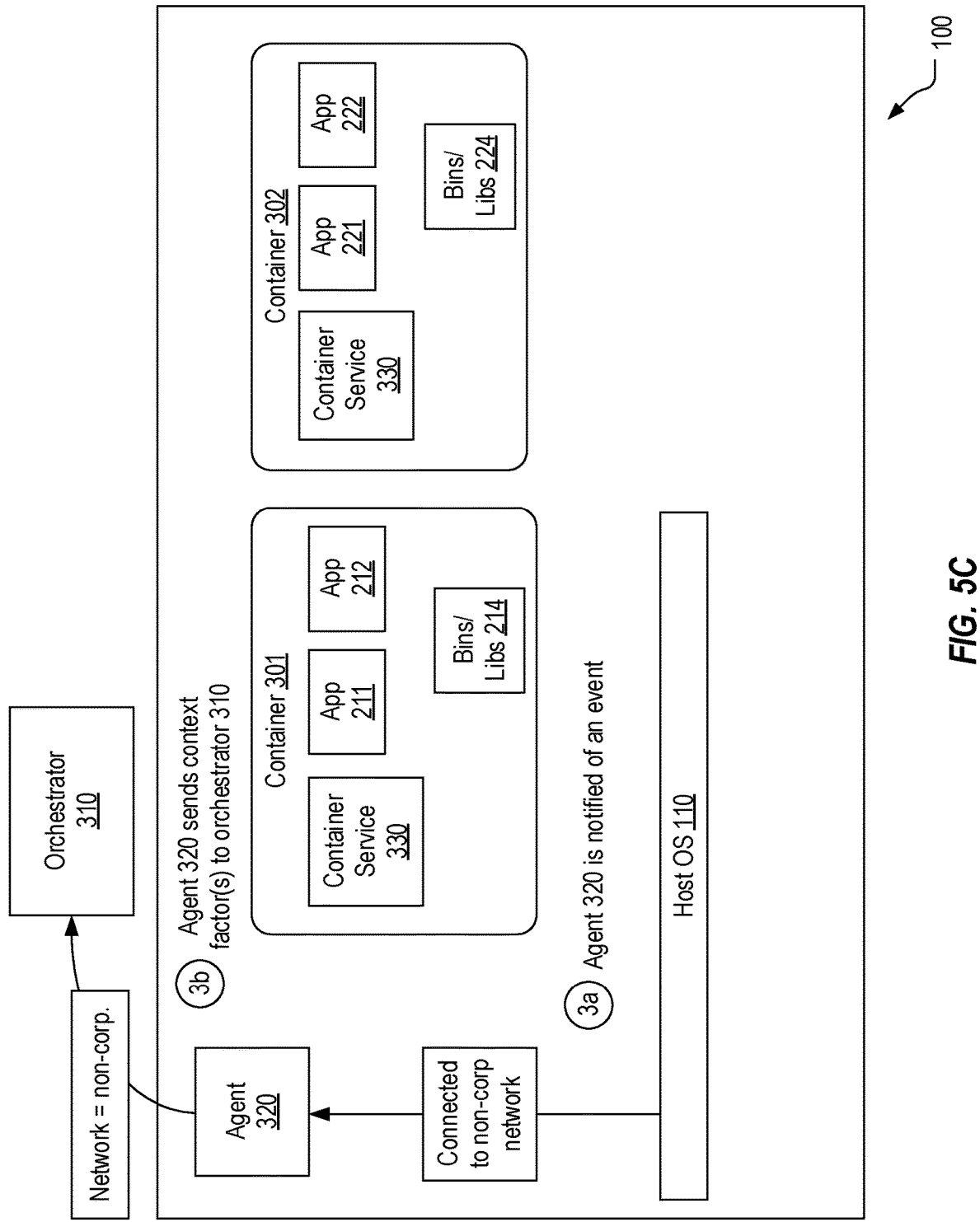

Turning to FIG. 5C, in step 3a, it is assumed that agent 320 is notified of an event for which it registered. For example, host operating system 110 may notify agent 320 that computing device 100 has connected to a non-corporate network. In step 3b, agent 320 can notify orchestrator 310 of the event such as by sending the respective context factor and possibly any other context factors as necessary. For example, in some instances, agent 320 may have already sent context factors to orchestrator 310 such that only the changed context factor needs to be sent. In contrast, in some embodiments, agent 320 may always send all context factors whenever any context factor changes.

Figure 5D:
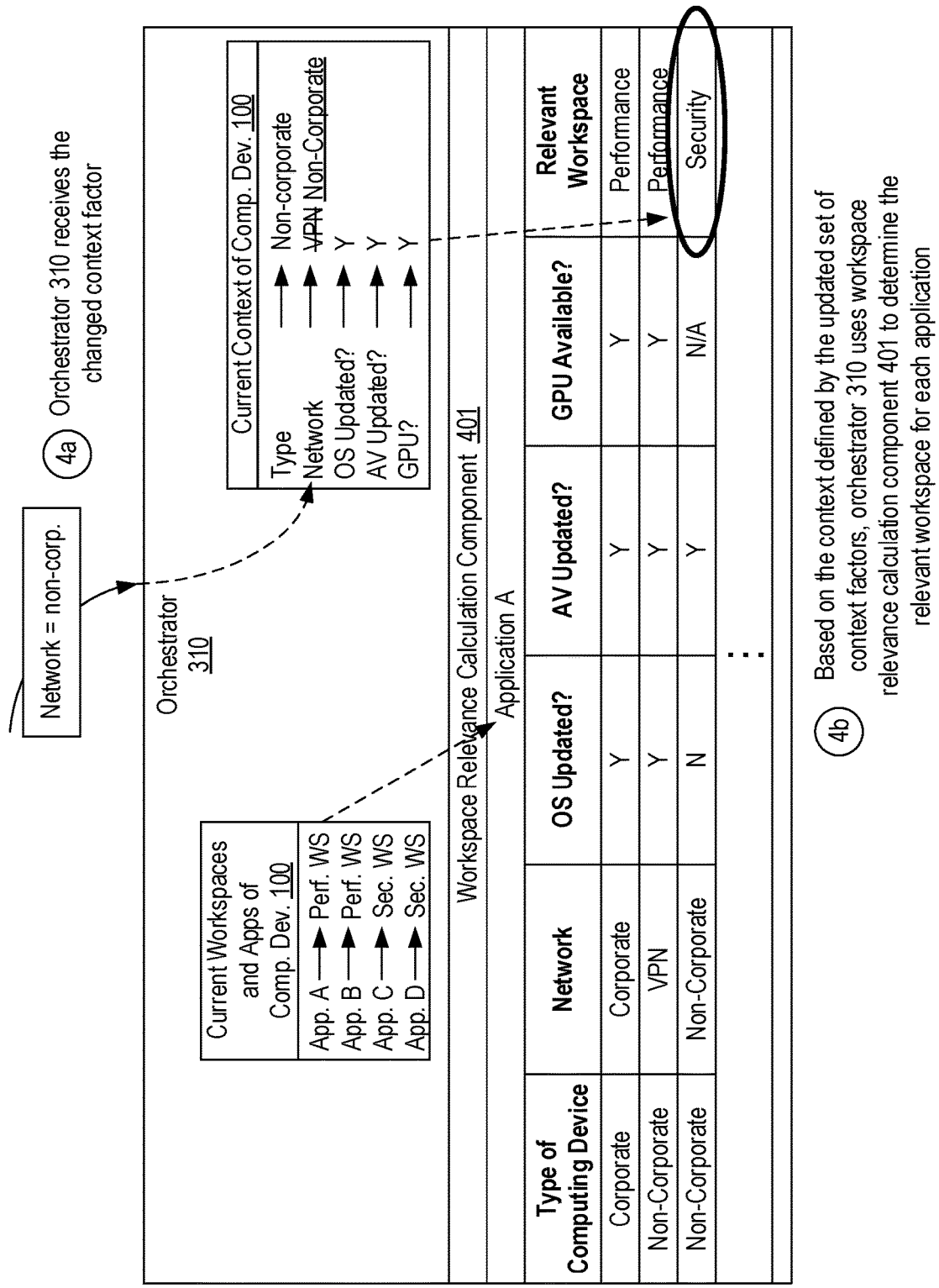

Turning to FIG. 5D, in step 4a, orchestrator 310 can receive the changed context factor (or otherwise be notified how computing device 100's context may have changed). As represented in FIG. 5D, orchestrator 310 can maintain the list of applications that are running on computing device 100 (as well as any others it manages) and their currently assigned workspaces (e.g., based on the information it received from agent 320 in step 2c). Orchestrator 310 may also maintain (or obtain) the context factors for computing device 100. In this example, it is assumed that, prior to step 4a, orchestrator 310 had determined or been notified that computing device 100 is a non-corporate computing device that was connected via a VPN to the corporate network and that had an updated operating system and antivirus software and a GPU.

In response to receiving the notification that computing device 100 has been connected to a non-corporate network (or that any other event has occurred that may represent a change in context), in step 4b, orchestrator 310 can employ this updated context factor and any other context factors it knows or obtains about computing device to determine, for each application running on computing device 100, which workspace is relevant to the current context of computing device 100. For example, orchestrator 310 can use workspace relevance calculation component 401 to determine that the security workspace is the relevant workspace for application A when computing device 100 is a non-corporate computing device that is connected to a non-corporate network. Notably, orchestrator 310 can perform step 4b for each application (e.g., for applications A, B, C and D) to determine the relevant workspace for each application. As suggested above, workspace relevance calculation component 401 can use different context factors, weighting of context factors, combinations of context factors, etc. for calculating the relevant workspace for each application.

Figure 5E:
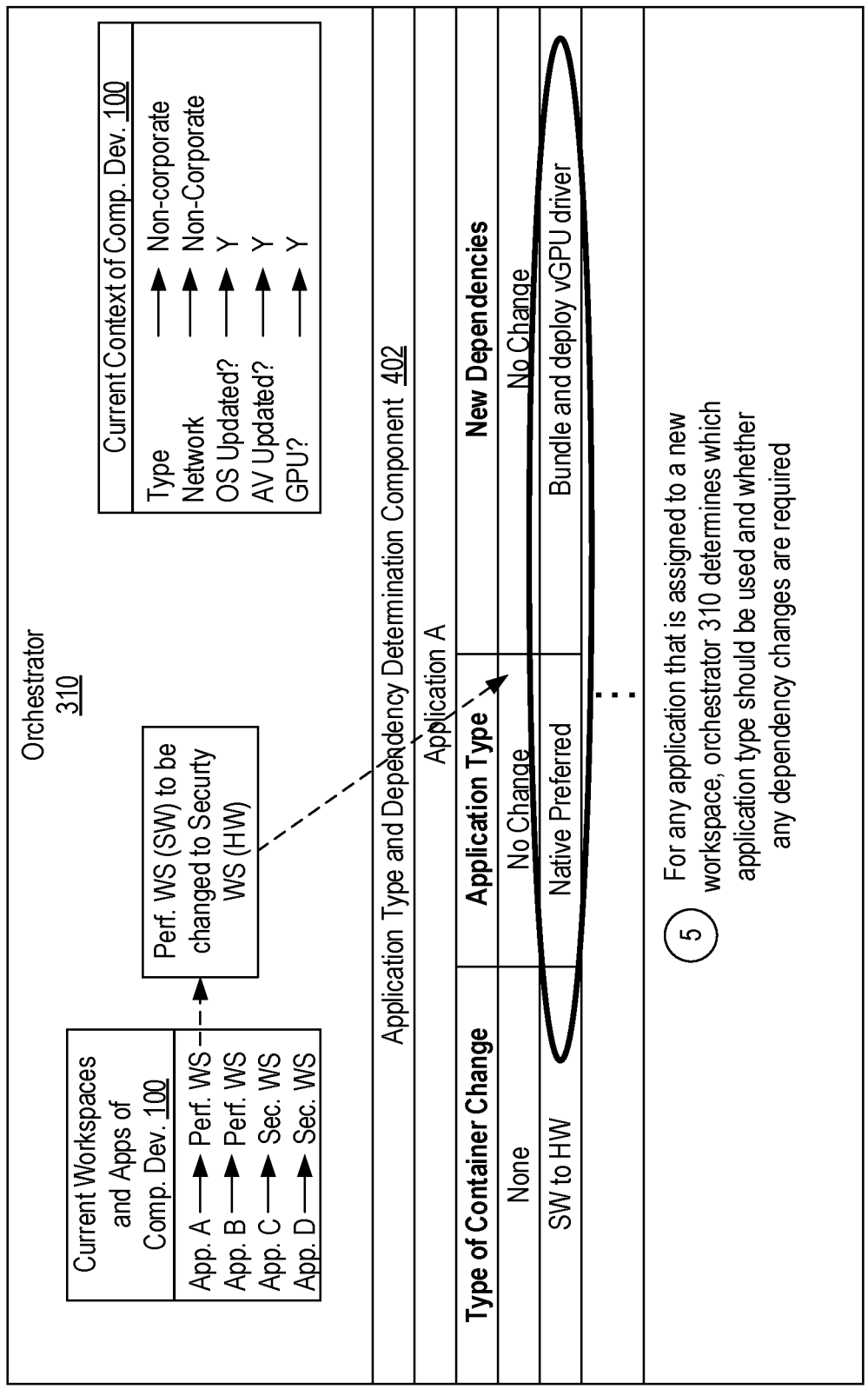

Turning to FIG. 5E, it is assumed that the performance workspace is implemented with a software container (i.e., application A is currently running in a software container on computing device 100) and that the security workspace is implemented with a hardware container. In step 5, for any application whose relevant workspace for the updated context is different from its current workspace, orchestrator 310 can employ application type and dependency determination component 402 to identify the type of the application that should be deployed in the newly calculated relevant workspace and any modifications that should be made to the application's dependencies. For example, based on the assumption that the relevant workspace for application A after computing device 100 connects to the non-corporate network is the security workspace and that this newly assigned workspace will entail a transition of application A from a software container to a hardware container, orchestrator 310 can determine from application type and dependency component 402 that a native version of application A should be deployed in the hardware container that implements the security workspace and that a vGPU driver should be bundled with the native version of application A (e.g., included in the binaries and libraries for application A). Notably, orchestrator 310 can perform this application type and dependency determination on a per-application basis. Also, step 5 can be performed at a later time as suggested below.

Figure 5F:
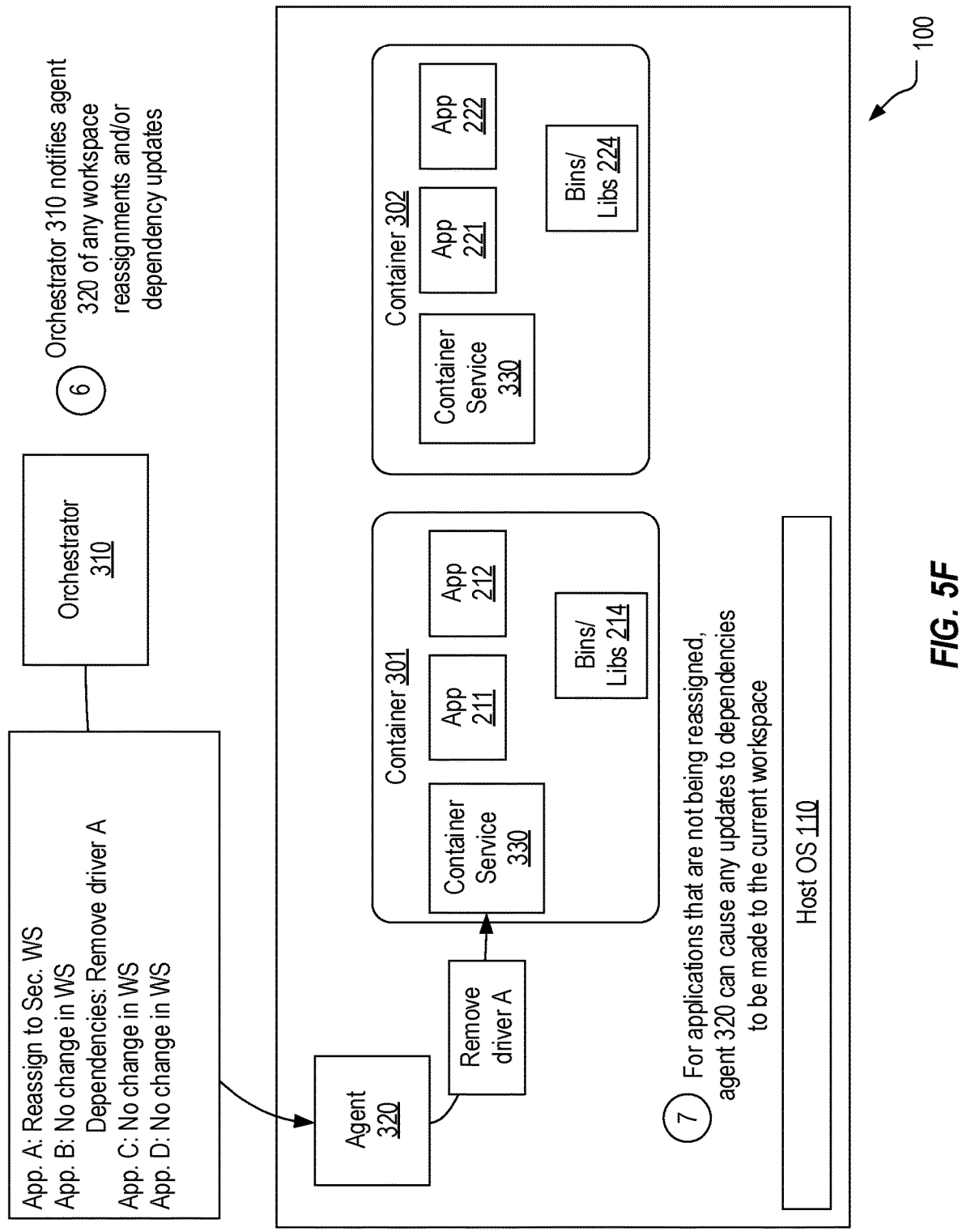

Turning to FIG. 5F, in step 6, orchestrator 310 can notify agent 320 of any applications that should be dynamically reassigned to a different workspace and/or of any updates to the dependencies of the applications, including applications that are to remain assigned to their current workspaces. For example, FIG. 5F indicates that application A is to be reassigned to the security workspace (although it need not specify the workspace at this stage). FIG. 5F also indicates that applications B, C and D are to remain assigned to their current workspaces but that driver A should be removed from application B's bundle in the performance workspace (although it not need specify applications for which no changes are to be made). In step 7, and for any application that is not being reassigned but for which a dependency update is specified, agent 320 can, in some embodiments, cause the dependency update to be made to the current workspace. Agent 320 can use any suitable technique to perform step 7 including communicating with container service 330 running in the container that implements the workspace, communicating with docker engine 130 or another component that manages the container, communicating with host operating system 110, etc. As one example, agent 320 could instruct container service 330 (or docker engine 130) to remove driver A from binaries and libraries 214. As another example, agent 320 could communicate with an ACPI/UEFI component of host operating system 110 to enable or disable a workspace's (or container's) access to ACPI methods and events. In some embodiments, as opposed to making the dependency update directly, orchestrator 310 may provide a rebundled application containing the dependency update to agent 320 which can then be deployed in place of the existing application bundle.

Figure 5G:
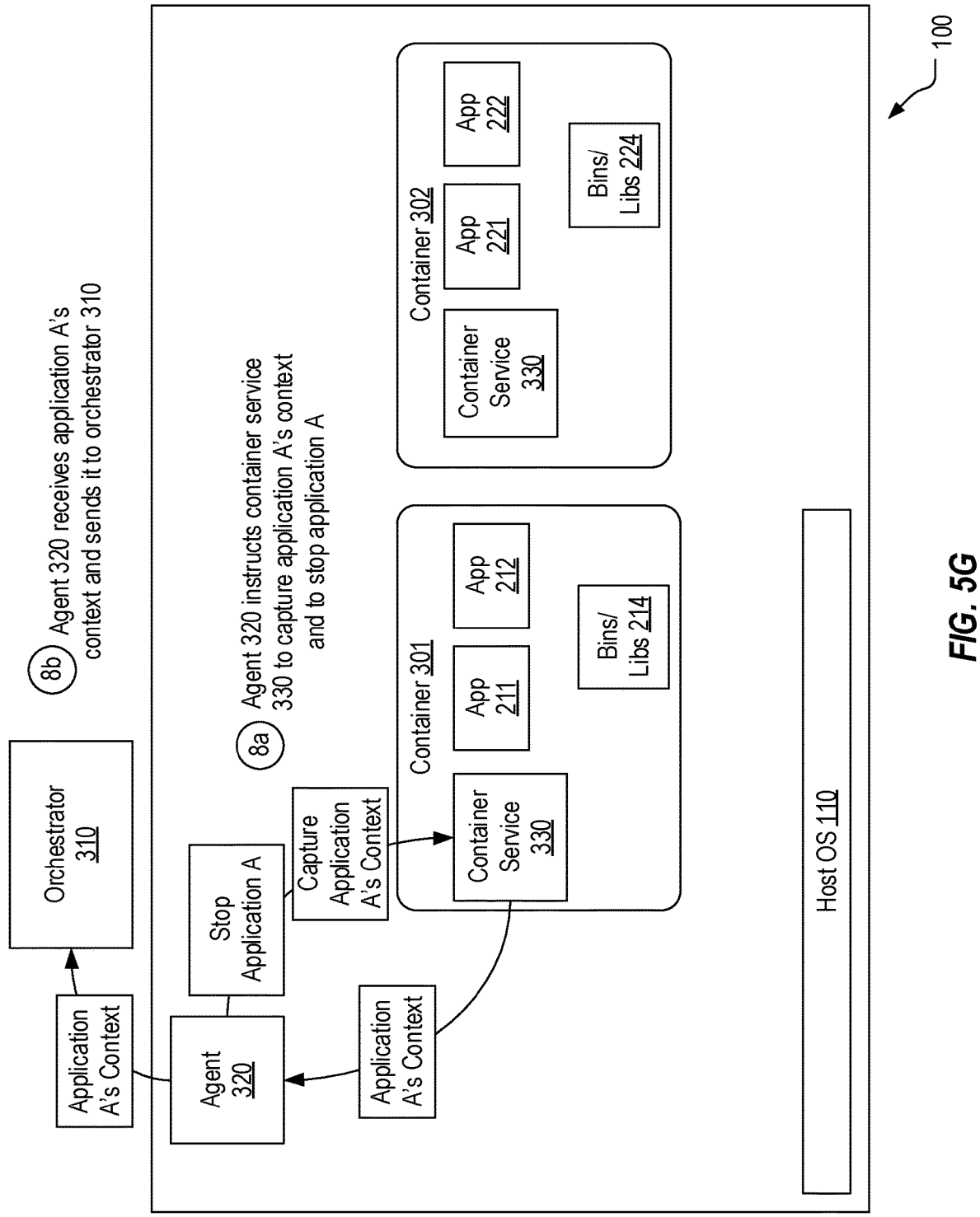
Figure 5H:
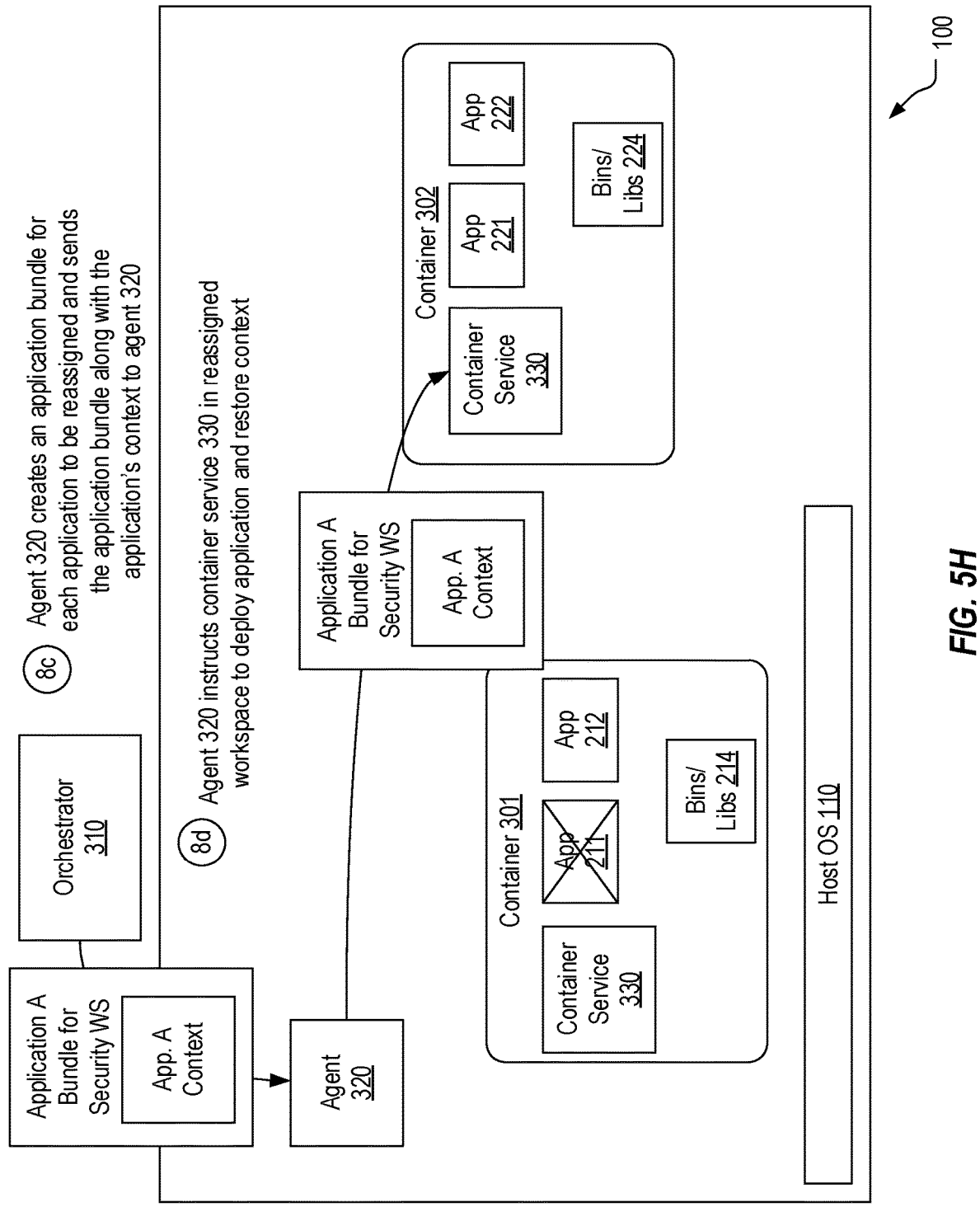

FIGS. 5G and 5H represent how agent 320 can cause an application to be dynamically reassigned to a workspace. In step 8a, and for each application to be reassigned, agent 320 can communicate with the instance of container service 330 that is running in the same container as the application to be reassigned. For example, because application A is to be reassigned from the performance workspace (container 301) to the security workspace (container 302), agent 320 can instruct the instance of container service 330 in container 301 to capture application A's context (application 211) and to stop application A. In some embodiments, this instruction to stop application A could be delayed until just before redeploying application A in the new workspace as described below. In step 8b, agent 320 can receive the context of any application to be reassigned and can relay the context to orchestrator 310. For example, agent 320 can send application A's context to orchestrator 310.

In step 8c, shown in FIG. 5H, agent 320 can create an application bundle for each application to be reassigned to a different workspace and can send the application bundle along with the application's context to agent 320. For example, as described above with reference to FIG. 5E, orchestrator 310 can determine from application type and dependency determination component 402 the type of the application that should be included in the application's bundle and any changes in dependencies in the application's bundle. For example, for application A, orchestrator 310 can include a native version of application A in the bundle, add the vGPU driver to the bundle and send the bundle to agent 320 along with application A's context.

In step 8d, agent 320 can provide each application bundle and the accompanying application context to the instance of container service 330 running in the container by which the reassigned workspace is implemented. For example, upon receiving the bundle for application A and the accompanying context for application A, agent 320 can send it to container service 330 running in container 302. Notably, FIG. 5H represents that application A (application 211) has been stopped in container 301.

Figure 5I:
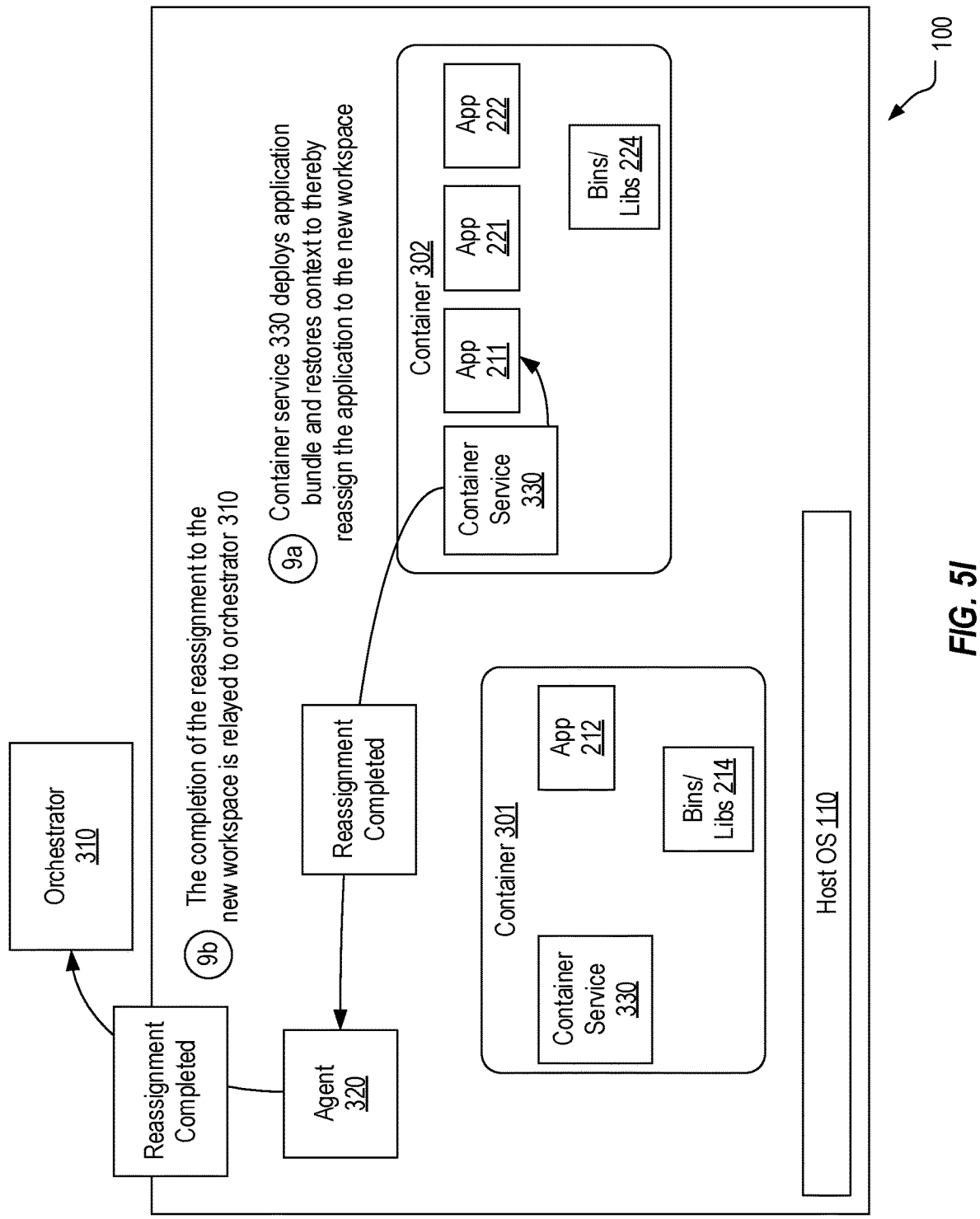

Turning to FIG. 5I, in step 9a, the instance of container service 330 running in the container which implements the reassigned workspace can deploy the application bundle and restore the accompanying context to thereby complete the reassignment of the application to the new workspace (i.e., the relevant workspace determined based on the current context of the computing device). For example, container service 330 running in container 302, which implements the security workspace on computing device 100, can deploy the bundle for application A and restore Application A's context (e.g., by launching the native version of application A, deploying any drivers or applying other dependencies and restoring caches files, configurations, metadata, etc.). Notably, this dynamic reassignment can be performed seamlessly from the user's perspective. For example, although there may be a brief period in which application A's window closes, it will soon reappear with the same context even though application A was terminated in container 301 and redeployed in container 302. Finally, in step 9b, the completion of the reassignment may be relayed back to orchestrator 310 so that orchestrator can update its internal data structures (e.g., by storing an indication that application A is mapped to the security workspace).

The above-described process can be performed whenever a computing device's context changes to ensure that each application runs in the workspace that is relevant to the current context. For example, whenever a relevant software or hardware event occurs, agent 320 can recommence the process at step 3b to cause applications to be dynamically reassigned based on the updated context that the event created.

In some embodiments, the reassignment of an application may be across computing devices. For example, a user may be using a work computing device on which an application is running but may transition to using his or her mobile device (or other personal computing device). Such a change in context could be detected in many different ways such as by detecting a lock event on the work computing device, detecting interactions with the mobile device, detecting GPS data or other location data of the mobile device that indicates that the user is no longer at work, etc. In such cases, the above-described process can be performed to cause the application with its captured context to be reassigned to a workspace that is implemented on the mobile device. In such a case, step 8c would entail sending the application bundle and context to an instance of agent 320 running on the mobile device as opposed to the instance of agent 320 running on the work computing device where the application was previously running.

As mentioned above, in some embodiments, orchestrator 310 may use machine learning to refine its determination of contexts and its determination of the relevant workspace for such contexts. In such cases, orchestrator 310 could be deployed on computing device 100 to thereby have greater access to context factors and other information for refining such determinations.

In summary, embodiments of the present invention may be implemented to ensure that applications that a user may use will be run in a workspace that is relevant to the context of the computing device the user is using. The applications can be dynamically reassigned to workspaces to create a seamless experience for the user, including preserving context of the applications across a reassignment.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for dynamically assigning an application to a workspace based on context, the method comprising:
    detecting, by an agent executing on a computing device, that a plurality of workspaces are available on the computing device;
    registering, by the agent, with one or more sources of events to be notified when events occur on the computing device;
    identifying, by the agent, a plurality of containers that are available on the computing device;
    identifying, by the agent and for each of the plurality of containers, one of the plurality of workspaces that the respective container implements, including determining that a first container of the plurality of containers implements a first workspace of the plurality of workspaces and that a second container of the plurality of containers implements a second workspace of the plurality of workspaces;
detecting that a context of a computing device has changed while a first application is running on the computing device in the first container that implements the first workspace;
based on the changed context, determining that a second workspace of the plurality of workspaces is relevant to the first application;
causing the first application to stop running in the first container that implements the first workspace; and
causing the first application to be run in the second container that implements the second workspace.

2. The method of claim 1, wherein the first container that implements the first workspace is deployed on the computing device.

3. The method of claim 2, wherein the second container that implements the second workspace is deployed on the computing device.

4. The method of claim 2, wherein the second container that implements the second workspace is deployed on a separate computing device.

5. The method of claim 1, wherein detecting that the context of the computing device has changed comprises detecting an event on the computing device based on a notification received from the one or more sources of events.

6. The method of claim 1, further comprising:
capturing a context of the first application in the first container that implements the first workspace; and
restoring the context of the first application in the second container that implements the second workspace.

7. The method of claim 1, further comprising:
creating a bundle that includes the first application and one or more dependencies;
wherein causing the first application to be run in the second container that implements the second workspace comprises causing the bundle to be deployed in the second container that implements the second workspace.

8. The method of claim 1, wherein a second application is running on the computing device in the first container or a different container that implements the first workspace when the context change is detected, the method further comprising:
based on the changed context, determining that the first workspace is relevant to the second application and that one or more dependencies of the second application should be changed; and
causing the one or more dependencies of the second application to be changed in the first container or the different container that implements the first workspace.

9. The method of claim 8, wherein causing the one or more dependencies of the second application to be changed in the first container or the different container that implements the first workspace comprises one or more of adding a driver or removing a driver.

10. The method of claim 1, wherein the first container that implements the first workspace is implemented with a software container and the second container that implements the second workspace is implemented with a hardware container.

11. The method of claim 1, wherein an orchestrator that is located remote to the computing device determines that the second workspace is relevant to the first application based on the changed context.

12. The method of claim 1, wherein causing the first application to be run in the second container that implements the second workspace comprises providing, by the agent, a bundle containing the first application to a container service running inside a container.

13. One or more computer storage media storing computer executable instructions which when executed by one or more processors implement a method for dynamically assigning an application to a workspace based on context, the method comprising:
detecting, by an agent executing on a computing device, that a plurality of workspaces are available on the computing device;
registering, by the agent, to be notified of events that occur on the computing device;
identifying, by the agent, a plurality of containers that are available on the computing device;
identifying, by the agent and for each of the plurality of containers, one of the plurality of workspaces that the respective container implements, including determining that a first container of the plurality of containers implements a first workspace of the plurality of workspaces and that a second container of the plurality of containers implements a second workspace of the plurality of workspaces;
in response to being notified of an event, sending, by the agent, a representation of the event to an orchestrator;
in response to sending the representation of the event to the orchestrator, receiving, by the agent and from the orchestrator, a bundle for a first application that was running in the first container that implements the first workspace when the event occurred; and
deploying the bundle to the second container that implements the second workspace on the computing device to thereby cause the first application to be run in the second container that implements the second workspace.

14. The computer storage media of claim 13, wherein the first container that implements the first workspace is implemented on the computing device.

15. The computer storage media of claim 13, wherein the first container that implements the first workspace is implemented on a separate computing device.

16. The computer storage media of claim 13, wherein deploying the bundle to the second container that implements the second workspace comprises restoring a context of the first application in the second container that implements the second workspace.

17. The computer storage media of claim 13, wherein the orchestrator runs on a separate computing device.

18. The computer storage media of claim 13, wherein the bundle includes one or more updates to dependences of the first application.

19. A method for dynamically assigning an application to a workspace based on context, the method comprising:
detecting, by an agent executing on a computing device, that a plurality of workspaces are available on the computing device;
registering, by the agent, with one or more sources of events to be notified when events occur on the computing device;
identifying, by the agent, a plurality of containers that are available on the computing device;

identifying, by the agent and for each of the plurality of containers, one of the plurality of workspaces that the respective container implements, including determining that a first container of the plurality of containers implements a first workspace of the plurality of workspaces and that a second container of the plurality of containers implements a second workspace of the plurality of workspaces;

detecting that a context of the computing device has changed while a first application is running on the computing device in the first container that implements the first workspace;

based on the changed context, determining that a second workspace is relevant to the first application; and causing the first application to be reassigned to the second container that implements the second workspace.

20. The method of claim 19, wherein causing the first application to be reassigned to the second container that implements the second workspace comprises:

causing the first application to stop running in the first container that implements the first workspace; and causing the first application to start running in the second container that implements the second workspace.

\* \* \* \* \*